(12) United States Patent
Hasegawa et al.

(10) Patent No.: US 8,670,025 B2
(45) Date of Patent: Mar. 11, 2014

(54) DISPLAY DEVICE AND CONTROL METHOD

(75) Inventors: Hiroshi Hasegawa, Kanagawa (JP); Kazuo Nakamura, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/857,220

(22) Filed: Aug. 16, 2010

(65) Prior Publication Data

US 2011/0050867 A1 Mar. 3, 2011

(30) Foreign Application Priority Data

Aug. 25, 2009 (JP) ................................ P2009-194187

(51) Int. Cl.
*H04N 13/04* (2006.01)
*H04N 9/47* (2006.01)

(52) U.S. Cl.
USPC .............................................. 348/55; 348/56

(58) Field of Classification Search
USPC ...................................................... 348/51–59
See application file for complete search history.

(56) References Cited

U.S. PATENT DOCUMENTS

| | | | | |
|---|---|---|---|---|
| 4,222,880 A * | 9/1980 | Baur et al. | ...................... | 398/212 |
| 4,644,509 A * | 2/1987 | Kiewit et al. | ...................... | 367/87 |
| 4,931,865 A * | 6/1990 | Scarampi | ........................ | 725/12 |
| 5,382,970 A * | 1/1995 | Kiefl | ............................. | 455/2.01 |
| 5,682,196 A * | 10/1997 | Freeman | ....................... | 725/139 |
| 7,369,100 B2 * | 5/2008 | Zacks et al. | ..................... | 345/1.3 |
| 7,450,188 B2 * | 11/2008 | Schwerdtner | .................... | 349/15 |
| 7,515,173 B2 * | 4/2009 | Zhang et al. | ................ | 348/14.16 |
| 8,031,272 B2 * | 10/2011 | Blatchley et al. | ............. | 348/836 |
| 8,115,877 B2 * | 2/2012 | Blatchley et al. | ............. | 348/836 |
| 8,159,526 B2 * | 4/2012 | Sato et al. | ........................ | 348/51 |
| 8,233,103 B2 * | 7/2012 | MacNaughton et al. | ........ | 349/13 |
| 8,294,752 B2 * | 10/2012 | Mihara et al. | .................... | 348/53 |
| 8,319,824 B2 * | 11/2012 | De La Barre et al. | .......... | 348/42 |
| 2009/0174658 A1 * | 7/2009 | Blatchley et al. | ............. | 345/158 |
| 2009/0285545 A1 * | 11/2009 | Bon | ................................ | 386/68 |
| 2010/0162285 A1 * | 6/2010 | Cohen et al. | ..................... | 725/12 |
| 2010/0195865 A1 * | 8/2010 | Luff | ............................... | 382/100 |
| 2011/0267437 A1 * | 11/2011 | Abeloe | ............................ | 348/51 |
| 2012/0069180 A1 * | 3/2012 | Kawamura | ..................... | 348/143 |

FOREIGN PATENT DOCUMENTS

| | | | | |
|---|---|---|---|---|
| JP | 10-333092 | 12/1998 | | |
| JP | 10333092 A | * 12/1998 | ............. | G02B 27/22 |
| JP | 2002-300610 | 10/2002 | | |
| JP | 2002300610 A | * 10/2002 | ............. | H04N 13/04 |

* cited by examiner

*Primary Examiner* — Christopher S Kelley
*Assistant Examiner* — Deirdre Beasley
(74) *Attorney, Agent, or Firm* — K&L Gates LLP

(57) ABSTRACT

A stereoscopic video display system includes a display device for displaying stereoscopic video, an image pickup element for generating image data, a position determiner for processing the image data received by the image pickup element to determine position information of at least one object identified in the image data, and a plurality of light output sections each having one or more light transmitters. Each light transmitter is configured to output timing signals having a signal strength based on the determined position information. The stereoscopic video display system also includes at least one set of shutter eyeglasses including a light receiving section for receiving timing signals output from at least one of the light transmitters of the light output sections.

17 Claims, 5 Drawing Sheets

LOW OUTPUT → HIGH OUTPUT

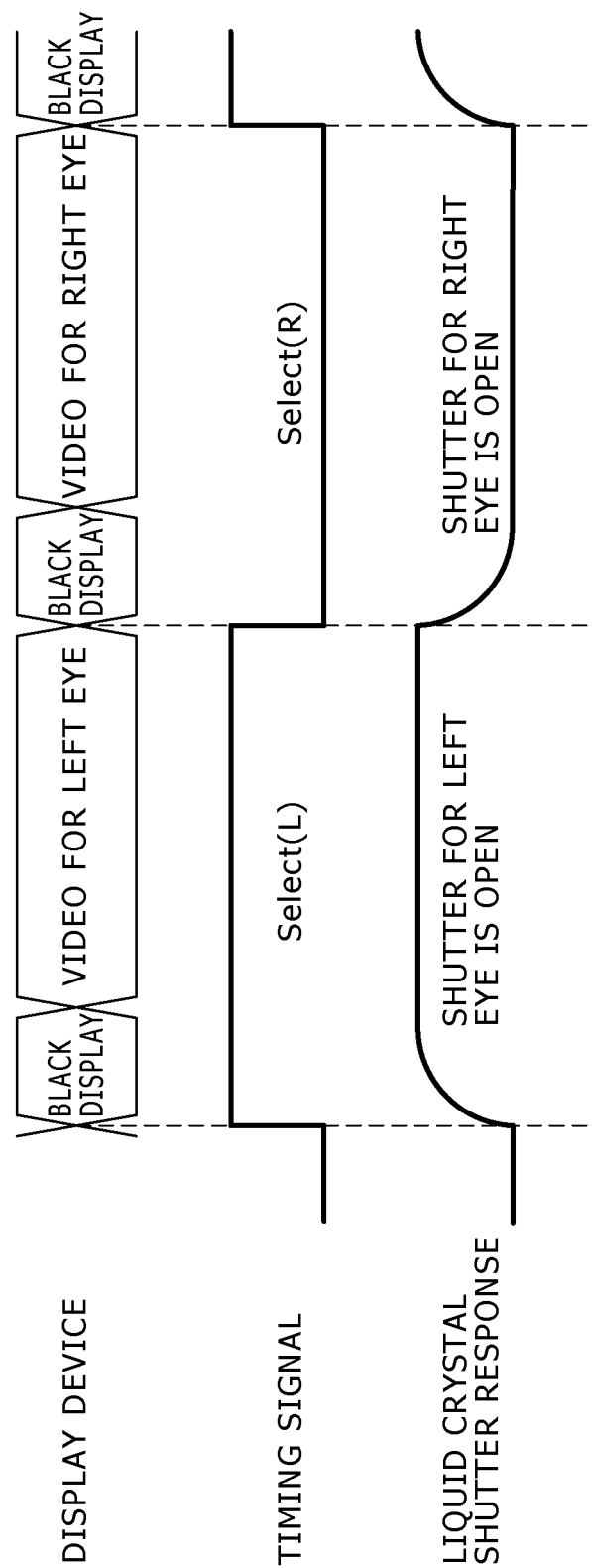
F I G . 5

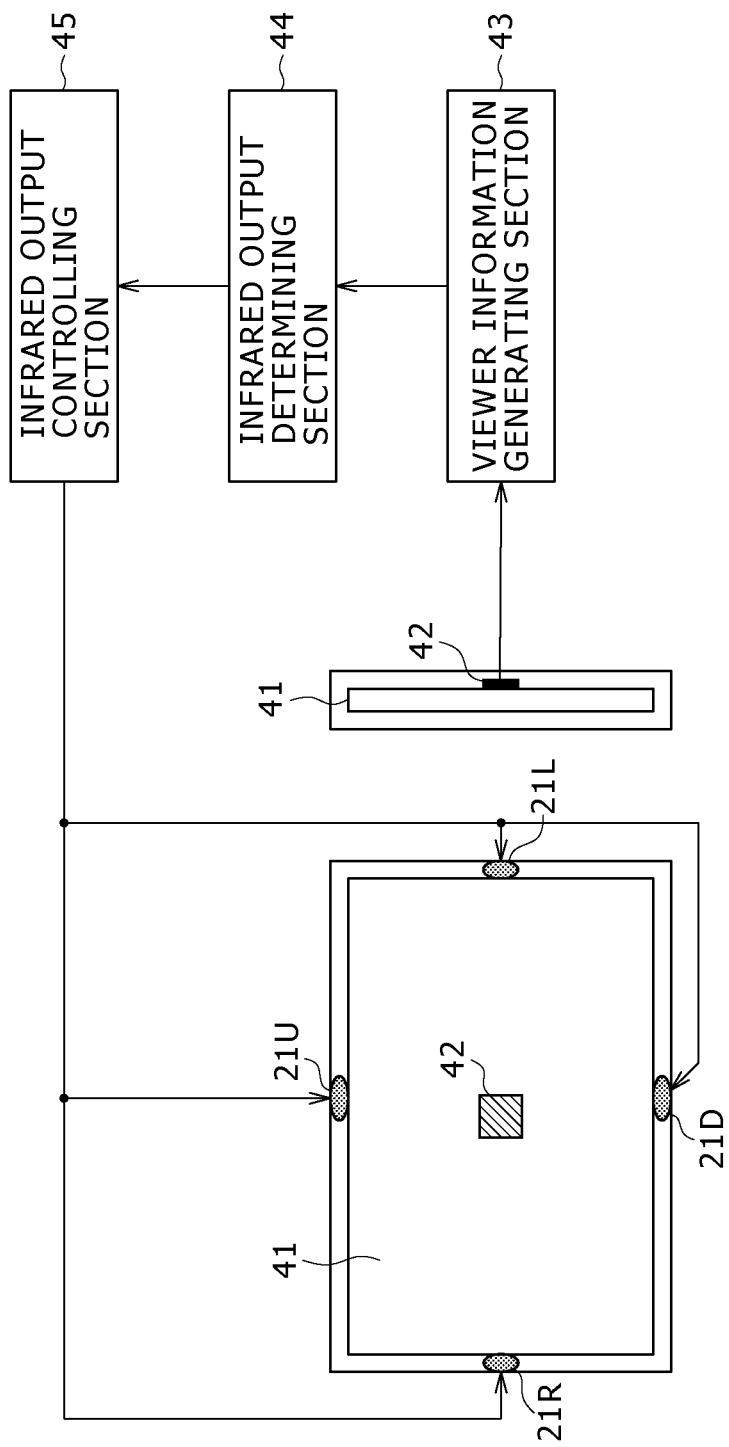

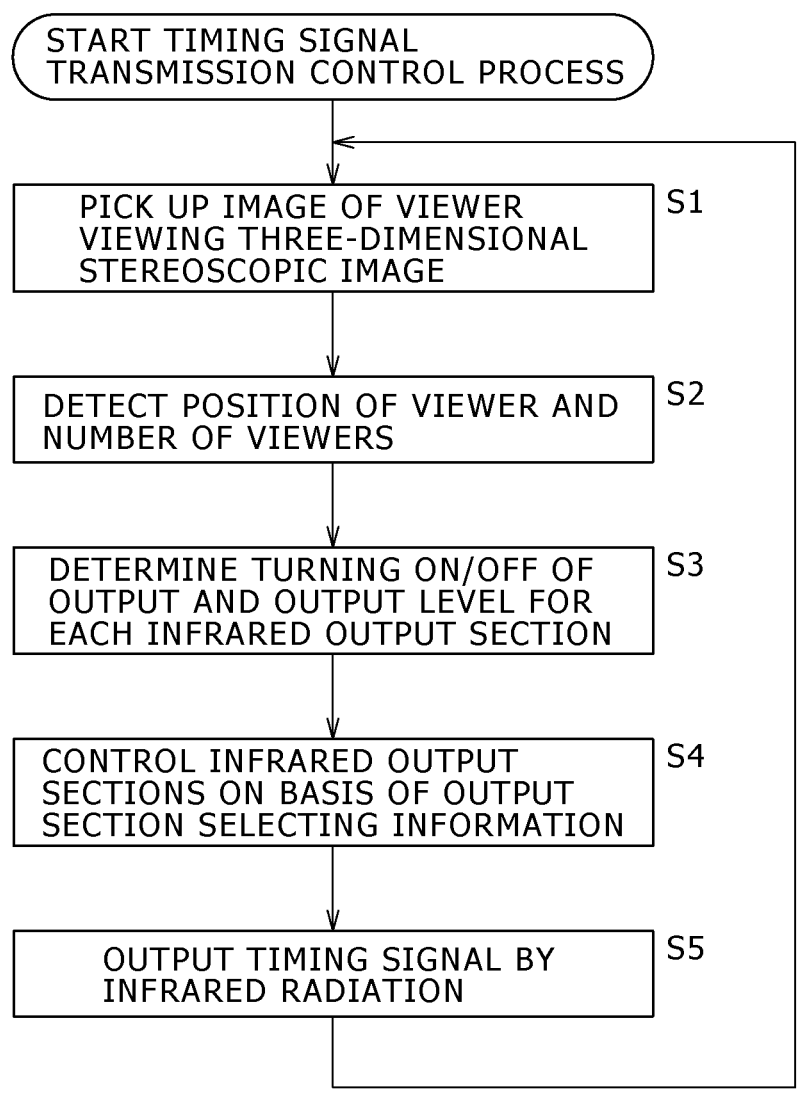

DISPLAY DEVICE AND CONTROL METHOD

CROSS REFERENCES TO RELATED APPLICATIONS

The present application claims priority to Japanese Patent Application JP 2009-194187 filed on Aug. 25, 2009, the entire contents of which is hereby incorporated by reference.

BACKGROUND

The present disclosure relates to a display device and a control method, and particularly to a display device and a control method that can control output of a timing signal optimally according to a viewer viewing three-dimensional stereoscopic video.

Three-dimensional stereoscopic video contents making stereoscopic visual perception of video possible have recently been drawing attention. A system for viewing three-dimensional stereoscopic video broadly includes two kinds of systems, that is, an eyeglass system and a naked eye system.

As an example of the eyeglass system, there is a system in which video for the left eye and video for the right eye are displayed on a time-division basis, which system is referred to also as a field sequential system. A viewer wears shutter eyeglasses provided with liquid crystal shutters, and perceives video for the left eye by the left eye and video for the right eye by the right eye. A parallax is provided to the video for the left eye and the video for the right eye. The parallax of the video for the left eye and the video for the right eye enables the viewer to perceive the video stereoscopically.

The eyeglass system needs to transmit a timing signal to the shutter eyeglasses in order to synchronize an operation of opening and closing the liquid crystal shutters with display of video for the left eye and video for the right eye. Radio communication by infrared radiation, radio waves and the like is generally employed to transmit and receive the timing signal.

The naked eye system separates video for the left eye and video for the right eye from each other by predetermined separating means to perceive three-dimensional stereoscopic video without wearing eyeglasses. The naked eye system includes a lenticular system employing a lenticular lens as separating means, a parallax barrier system employing a parallax barrier as separating means, and the like.

In certain naked eye systems, the position of the head part of a viewer viewing three-dimensional stereoscopic video is detected, and control is performed to change a range where stereoscopic vision is possible (see Japanese Patent Laid-Open Nos. 2002-300610 and Hei 10-333092, for example).

SUMMARY

Heretofore, when a timing signal is output to shutter eyeglasses in the eyeglass system, the direction of the output is fixed at one direction or fixed so as to spread at a wide angle, and is not changed to an optimum direction according to the position and number of viewers. In addition, the output level of the signal is fixed at a certain level, and the output level is not automatically changed according to the number of viewers or the like.

When the output direction is fixed at one direction and when the output level is fixed at a low level, no problem is presented as long as three-dimensional stereoscopic video is viewed by an individual or a small number of people in a small area. However, because of a limited viewing range, liquid crystal shutters cease to operate outside the viewing range, so that the three-dimensional stereoscopic video cannot be perceived.

On the other hand, when the output direction is fixed at a wide angle and when the output level is fixed at a high level, a wide viewing range is ensured. However, when the timing signal is output by infrared radiation, for example, another electronic device having an infrared receiving section may receive the timing signal and cause an erroneous operation. In addition, a needlessly high output level means unnecessary consumption of power, which is not desirable from a viewpoint of saving power.

It is desirable to control output of a timing signal optimally according to a viewer viewing three-dimensional stereoscopic video.

According to an embodiment, a stereoscopic video display system includes: a display device for displaying stereoscopic video; an image pickup element for generating image data; a position determiner for processing the image data received by the image pickup element to determine position information of at least one object identified in the image data; a plurality of light output sections each having one or more light transmitters, each light transmitter configured to output timing signals having a signal strength based on the determined position information; and at least one set of shutter eyeglasses including a light receiving section for receiving timing signals output from at least one of the light transmitters of the light output sections.

According to another embodiment, a display system includes: a display device; an image pickup element for generating image data; a position determiner for processing the image data received by the image pickup element to determine position information of at least one object identified in the image data; and a plurality of light transmitters configured to output timing signals, each timing signal output from each of the light transmitters having a signal strength based on the determined position information.

According to another embodiment, a system for controlling output of at least one light transmitter is provided. The system includes: an image pickup element for generating image data of at least one object positioned a distance away from the image pickup element; a position determiner for processing the image data received by the image pickup element to determine position information of the at least one object identified in the image data; and an light output controlling section for controlling output strength level of at least one light transmitter based on the determined position information.

According to another embodiment, a position information determination system comprising: an image pickup element for generating image data of at least one object positioned a distance away from the image pickup element; and a position determiner for processing the image data received by the image pickup element to determine position information of the at least one object identified in the image data. In this embodiment, the position information is relative to a position of the image pickup element and includes vertical position information, horizontal position information, and distance information for each of the objects.

According to an embodiment, the output of a timing signal can be controlled optimally according to a viewer viewing three-dimensional stereoscopic video.

Additional features and advantages are described herein, and will be apparent from the following Detailed Description and the figures.

BRIEF DESCRIPTION OF THE FIGURES

FIG. 5 is a diagram of assistance in explaining display control of three-dimensional stereoscopic video;

FIG. 6 is a diagram showing an example of functional configuration for timing signal transmission control; and FIG. 7 is a flowchart of assistance in explaining the timing signal transmission control.

DETAILED DESCRIPTION

[Example of Configuration of Three-Dimensional Stereoscopic Video Display System]

Figure 1:
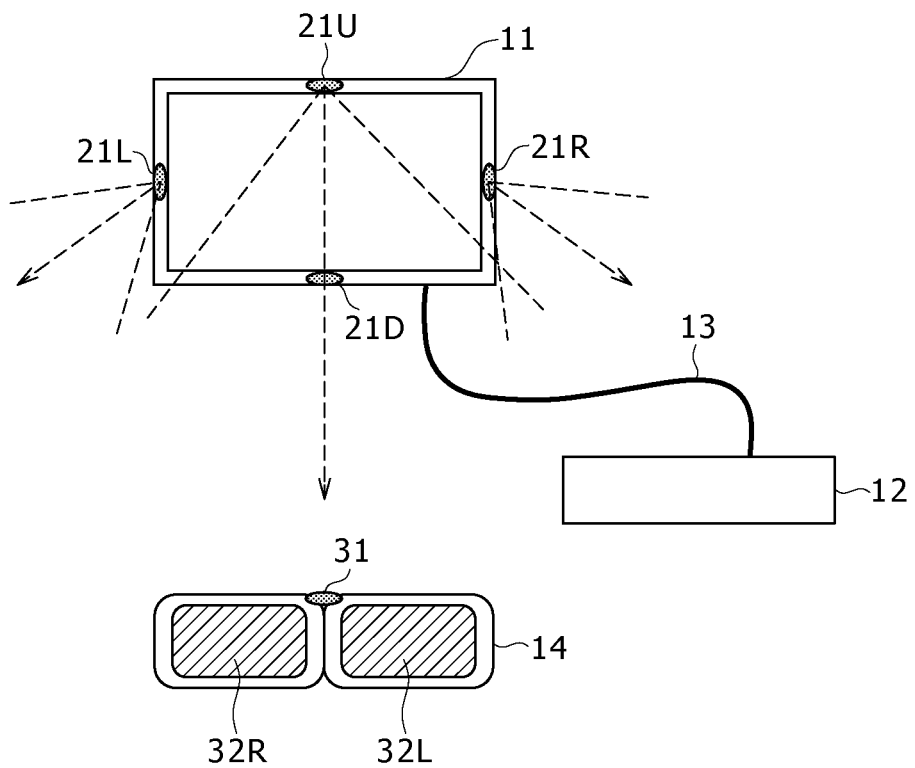
FIG. 1 is a diagram showing an example of configuration of an embodiment of a three-dimensional stereoscopic video display system to which the is applied.

FIG. 1 shows an example of configuration of an embodiment of a three-dimensional stereoscopic video display system to which the embodiment is applied.

The three-dimensional stereoscopic video display system of FIG. 1 includes a display device 11, a recording and reproducing device 12, a signal transmission cable 13, and shutter eyeglasses 14.

The display device 11 displays three-dimensional stereoscopic video on the basis of a video signal supplied from the recording and reproducing device 12 via the signal transmission cable 13. In the present embodiment, the display device 11 is formed by an organic EL (Electro Luminescent) display, for example. Incidentally, the display device 11 may receive a video signal for three-dimensional stereoscopic video by not only receiving the video signal from the recording and reproducing device 12 but also receiving a broadcast signal, for example.

The display device 11 has infrared output sections (emitters) 21R, 21L, 21U, and 21D at a right end, a left end, an upper central part, and a lower central part, respectively, of the display device 11. Incidentally, in the following, when each of the infrared output sections 21R, 21L, 21U, and 21D does not particularly need to be distinguished from the other, the infrared output sections 21R, 21L, 21U, and 21D will be referred to simply as an infrared output section 21.

Figure 2:
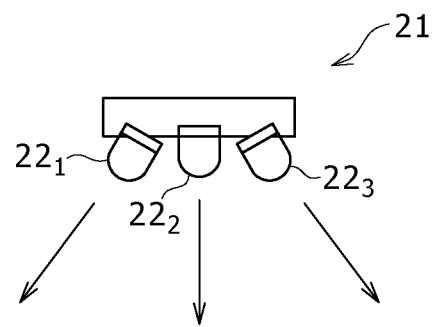
FIG. 2 is a diagram of assistance in explaining an infrared output section.
Figure 3:
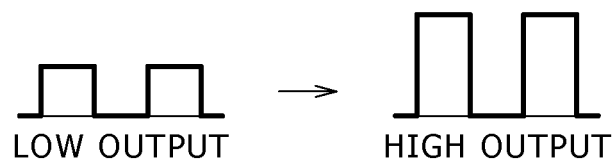
FIG. 3 is a diagram of assistance in explaining the infrared output section.

The infrared output section 21 is for example composed of three transmitters $22_1$ to $22_3$ arranged so as to correspond to three directions as shown in FIG. 2. The infrared output section 21 outputs a timing signal by infrared radiation with a predetermined angle as a radiation range which predetermined angle has a direction indicated by an arrow in FIG. 1 as a center thereof. Incidentally, each of the three transmitters $22_1$ to $22_3$ can select (control) an output level to be one of "strong" and "weak," as shown in FIG. 3.

The recording and reproducing device 12 reproduces the three-dimensional stereoscopic video (contents) stored on a recording medium, and supplies the video signal to the display device 11 via the signal transmission cable 13. The recording and reproducing device 12 for example corresponds to a recorder, a personal computer or the like having an optical disk such as a DVD (Digital Versatile Disc), a Blu-Ray Disc (trademark) or the like, a hard disk and the like as recording media.

The shutter eyeglasses 14 are worn by a viewer when viewing the three-dimensional stereoscopic video. The shutter eyeglasses 14 have a light receiving section 31 for receiving the timing signal output from the infrared output section 21 of the display device 11. The shutter eyeglasses 14 also have a shutter 32L for the left eye and a shutter 32R for the right eye. The shutter eyeglasses 14 perform an operation of opening and closing the shutter 32L for the left eye and the shutter 32R for the right eye in synchronism with the received timing signal.

[Display Control of Three-Dimensional Stereoscopic Video]

Display control of three-dimensional stereoscopic video will be described with reference to FIG. 4 and FIG. 5.

Video for the left eye and video for the right eye are displayed on the display device 11 on a time-division basis. Specifically, as shown in FIG. 4, the video for the left eye and the video for the right eye are displayed alternately, such as video L1 for the left eye, video R1 for the right eye, video L2 for the left eye, video R2 for the right eye, . . . .

The shutter eyeglasses 14 alternately repeat two states, that is, a state of the shutter 32L for the left eye being opened and the shutter 32R for the right eye being closed and a state of the shutter 32L for the left eye being closed and the shutter 32R for the right eye being opened, in synchronism with the timing signal.

As shown in FIG. 5, the display device 11 displays the video for the left eye and the video for the right eye with a black display period for preventing interference (crosstalk) between the video for the left eye and the video for the right eye interposed therebetween. The black display period includes a V-blanking period of the video signal.

A signal indicating selection of the shutter 32L for the left eye is output from the infrared output section 21 in a period of display of the video for the left eye, and a signal indicating selection of the shutter 32R for the right eye is output from the infrared output section 21 in a period of display of the video for the right eye. The selection of the shutter 32L for the left eye or the shutter 32R for the right eye is changed at the beginning of a black display period. The example of FIG. 5 shows that the shutter 32L for the left eye is selected when the timing signal is high and that the shutter 32R for the right eye is selected when the timing signal is low.

The shutter eyeglasses 14 perform an operation of switching between the shutter 32L for the left eye and the shutter 32R for the right eye according to the received timing signal. The operation of switching between the shutter 32L for the left eye and the shutter 32R for the right eye is completed in a black display period. A state of the shutter 32L for the left eye being opened is retained in a period of display of the video for the left eye, and a state of the shutter 32R for the right eye being opened is retained in a period of display of the video for the right eye.

Figure 4:
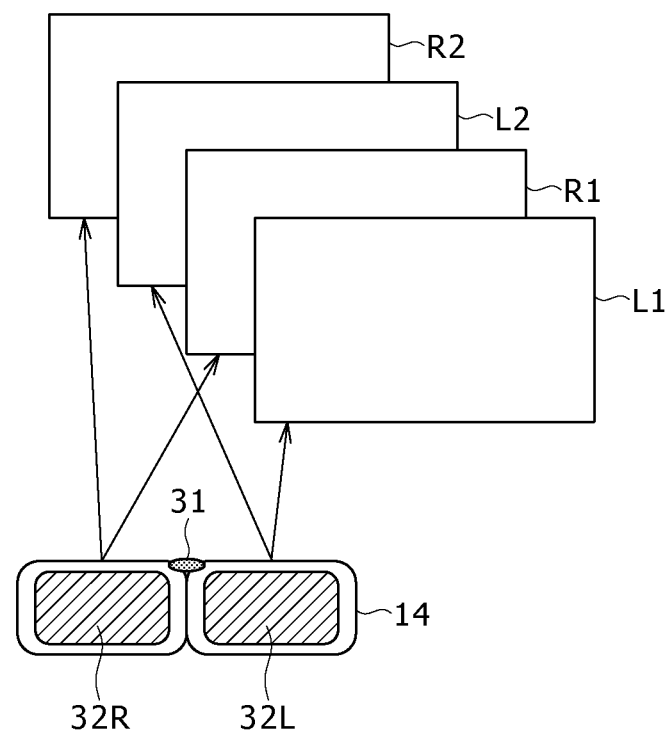
FIG. 4 is a diagram of assistance in explaining display control of three-dimensional stereoscopic video.

As a result, as shown by arrows in FIG. 4, only the video for the right eye is input to the right eye of the viewer, and only the video for the left eye is input to the left eye of the viewer. A parallax is provided to the video for the left eye and the video for the right eye. The parallax of the video for the left eye and the video for the right eye enables the viewer to perceive the video stereoscopically.

[Timing Signal Transmission Control of Display Device 11]

FIG. 6 shows an example of functional configuration for timing signal transmission control of the display device 11.

An image pickup element 42 is disposed in substantially a central part of an organic EL panel 41 included in the display device 11 on a back side of the organic EL panel 41. The image pickup element 42 for example has 640×480 pixels referred to as a VGA (Video Graphics Array). The image pickup element 42 is formed by a CCD (Charge Coupled Device), a CMOS (Complementary Metal Oxide Semiconductor) sensor or the like.

The image pickup element 42 picks up an image of a viewer viewing the three-dimensional stereoscopic video by receiving light passed through free space parts of a plurality of pixel circuits arranged in a row and a column direction in the organic EL panel 41. Because the image pickup element 42 is disposed in substantially the central part of the organic EL panel 41, the image pickup element 42 can determine the position of the viewer accurately (uniformly). The image pickup element 42 supplies an image obtained as a result of the image pickup to a viewer information generating section 43.

The viewer information generating section 43 detects the position and the number of viewers viewing the three-dimensional stereoscopic video by performing predetermined image processing on the image supplied from the image pickup element 42. The viewer information generating section 43 supplies the position and the number of viewers viewing the three-dimensional stereoscopic video as position information and head count information to an infrared output determining section 44.

The viewer position information for example includes three parameters of a vertical direction (top, middle, and bottom), a horizontal direction (left, middle, and right), and a distance (far and near). For example, when it is detected that a viewer is located far on a left side with respect to the display device 11, information indicating that "vertical direction, horizontal direction, distance"="middle, left, far" is output as position information. In addition, for example, when it is detected that a large number of viewers are viewing the three-dimensional stereoscopic video in a state of being spread on each of a right side, a center, and a left side with respect to the display device 11, information indicating that "vertical direction, horizontal direction, distance"="middle, left middle right, far" is output as position information.

On the other hand, the viewer head count information for example includes three parameters of large, medium, and small. For example, "small" is output as head count information when one viewer is viewing the three-dimensional stereoscopic video, "medium" is output as head count information when two or three people are viewing the three-dimensional stereoscopic video, and "large" is output as head count information when four or more people are viewing the three-dimensional stereoscopic video.

The position and number of viewers can be detected by image processing as follows, for example. Viewers viewing the three-dimensional stereoscopic video necessarily wear the shutter eyeglasses 14, which are special eyeglasses. Accordingly, the position and number of viewers can be detected by detecting the number and size of shutter eyeglasses 14 by pattern matching or the like. In addition, the position and number of viewers may be detected by face detection processing or the like commonly performed in a digital camera or the like.

Incidentally, the detection and output of the position information and the head count information as described above are a mere example.

The infrared output determining section 44 determines the turning on/off of output and output level for the infrared output sections 21R, 21L, 21U, and 21D from the position information and the head count information supplied from the viewer information generating section 43. In this case, the turning on/off of output of the infrared output sections 21R, 21L, 21U, and 21D corresponds to determination of an output direction of infrared output.

The infrared output determining section 44 assigns the infrared output section 21R for viewers situated in a right direction as viewed from the display device 11 and assigns the infrared output section 21L for viewers situated in a left direction as viewed from the display device 11. In addition, the infrared output determining section 44 assigns the infrared output section 21U for viewers situated at a long distance in a direction of the center of the display device 11 and assigns the infrared output section 21D for viewers situated at a short distance in the direction of the center of the display device 11.

For example, when information indicating that "vertical direction, horizontal direction, distance"="middle, middle, near" is output as position information and "small" is output as head count information, the infrared output determining section 44 determines that only the infrared output section 21D is to produce output at an output level "weak."

In addition, for example, when information indicating that "vertical direction, horizontal direction, distance"="middle, left middle right, far" is output as position information and "large" is output as head count information, the infrared output determining section 44 determines that all the infrared output sections 21 are to produce output at an output level "strong."

The infrared output determining section 44 supplies information on the determined infrared output sections 21 as output section selecting information to an infrared output controlling section 45.

The infrared output controlling section 45 controls the infrared output sections 21R, 21L, 21U, and 21D on the basis of the output section selecting information supplied from the infrared output determining section 44.

[Flowchart of Timing Signal Transmission Control]

FIG. 7 is a flowchart of timing signal transmission control. This process can be started so as to coincide with a start of display control of three-dimensional stereoscopic video, for example.

First, in step S1, the image pickup element 42 picks up an image of viewers viewing three-dimensional stereoscopic video. The image obtained as a result of the image pickup is supplied to the viewer information generating section 43.

In step S2, the viewer information generating section 43 detects the position and number of the viewers on the basis of the image supplied from the image pickup element 42. The viewer information generating section 43 supplies a result of the detection as position information and head count information to the infrared output determining section 44.

In step S3, the infrared output determining section 44 determines the turning on/off of output and an output level for each infrared output section 21 from the position information and the head count information supplied from the viewer information generating section 43. A result of the determination is supplied as output section selecting information to the infrared output controlling section 45.

In step S4, the infrared output controlling section 45 controls the infrared output sections 21R, 21L, 21U, and 21D on the basis of the output section selecting information supplied from the infrared output determining section 44.

In step S5, the infrared output sections 21R, 21L, 21U, and 21D output a timing signal by infrared radiation at the set output levels under control of the infrared output controlling section 45.

After step S5, the process returns to step S1 to repeat the process of steps S1 to S5 described above until the display control of the three-dimensional stereoscopic video is ended.

As described above, the display device 11 detects the viewing position and number of viewers viewing three-dimensional stereoscopic video, and controls the output of the plurality of infrared output sections 21 according to a result of the detection. Thereby, the output of the timing signal can be controlled optimally according to the viewers viewing the three-dimensional stereoscopic video.

In addition, the display device 11 can perform control so as not to send out the timing signal from a infrared output section 21 for a direction without a viewer, and control (vary) output level according to the distance of viewers. Thereby, power consumption of the display device 11 can be reduced. In addition, erroneous operation of a device operating by receiving infrared rays, which device is installed in the vicinity of the display device 11, can be prevented.

Further, because the display device 11 has the plurality of infrared output sections 21 corresponding to the respective directions such as the right direction, the left direction, and the center direction, for example, the display device 11 can widen a range of output of the timing signal so as to correspond to a viewing angle of a screen.

In the foregoing embodiment, the turning on/off of infrared output and output level thereof are controlled in units of the infrared output sections 21. However, because the infrared output sections 21 are formed by three transmitters $22_1$ to $22_3$ as shown in FIG. 2, the turning on/off and output level of each of the three transmitters $22_1$ to $22_3$ of the infrared output sections 21 may also be controlled.

In addition, in the present embodiment, the output level is set to two steps of "strong" and "weak." However, the output level may be set to three or more steps. Alternatively, the output level may be set to an arbitrary output level such as an output level corresponding to a distance to a detected viewer.

In the foregoing embodiment, description has been made of a case where the display device 11 is an organic EL display. However, other embodiments are applicable not only to organic EL displays but also displays employing an optically transmissive display panel that allows the image pickup element 42 to pick up an image even when the image pickup element 42 is disposed on the back side of the display panel. Incidentally, in a case of a non-transmissive display panel, the image pickup element 42 can be disposed in a frame part on the periphery of the display panel.

Further, while the timing signal is output by infrared radiation in the foregoing embodiment, other radio communications by radio waves and the like can be adopted. In addition, the number of infrared output sections 21 provided to the display device 11 is not limited to four, but may be one, two, or five or more.

It is to be noted that in the present specification, the steps described in the flowchart may of course be performed in time series in the described order, but may be performed in parallel or in necessary timing when a call is made, for example, without being necessarily handled in time series.

In the present specification, a system refers to an entire device formed by a plurality of devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A stereoscopic video display system comprising:
a display device for displaying stereoscopic video;
an image pickup element for generating image data;
a position determiner for processing the image data received by the image pickup element to determine position information of at least one object identified in the image data;
a plurality of light output sections each having one or more light transmitters, each light transmitter configured to output timing signals having a signal strength based on the determined position information; and
at least one set of shutter eyeglasses including a light receiving section for receiving timing signals output from at least one of the light transmitters of the light output sections,
wherein the light output sections include a light output section at a right end, a left end, an upper central part, and a lower central part of the display device, wherein each of the light output sections include a plurality of light transmitters configured to output timing signals at a plurality of different strength levels,
wherein the position information is relative to a position of the image pickup element and includes vertical position information, horizontal position information, and distance information for each of the objects identified in the image data, and
wherein for a given object, a signal strength of the timing signals directed towards said object is directly related to a determined distance of said object from the image pickup element.

2. The stereoscopic video display system according to claim 1, wherein the position determiner determines the position information and a number of objects in the image data based on a result of a predetermined image processing performed on the image data.

3. The stereoscopic video display system according to claim 2, wherein the strength of the timing signals is directly related to the number of objects determined by the position determiner.

4. The stereoscopic video display system according to claim 1, wherein the set of shutter eyeglasses includes a first shutter and a second shutter.

5. The stereoscopic video display system of claim 4, wherein the first shutter is selected when a timing signal having a first signal strength is received by the light receiving section, and the second shutter is selected when a timing signal having a second signal strength is received by the light receiving section, the second signal strength being different than the first signal strength.

6. The stereoscopic video display system of claim 4, wherein the set of shutter eyeglasses alternately cycle between two states in accordance with a synchronization with the timing signals sent by the light transmitters and received by the light receiving section, a first state is where the first shutter is opened and the second shutter is closed, and the second state is where the first shutter is closed and the second shutter is opened.

7. The stereoscopic video display system of claim 6, wherein the display device displays images on a time-division basis that is in synchronization with the alternate states of the shutter eyeglasses, where a first set of images to be viewed through the first shutter are displayed during time intervals of the first state, and a second set of images to be viewed through the second shutter are displayed during time intervals of the second state.

8. The stereoscopic video display system according to claim 1, wherein the display device is an organic electroluminescent device.

9. A display system comprising:
a display device;

an image pickup element for generating image data;

a position determiner for processing the image data received by the image pickup element to determine position information of at least one object identified in the image data; and a plurality of light transmitters configured to output timing signals, each timing signal output from each of the light transmitters having a signal strength based on the determined position information, wherein the position information is relative to a position of the image pickup element and includes vertical position information, horizontal position information, and distance information for each of the objects identified in the image data, and wherein for a given object, a signal strength of the timing signals directed towards said object is directly related to a determined distance of said object from the image pickup element.

10. The display system according to claim 9, further comprising light output sections at a right end, a left end, an upper central part, and a lower central part of the display device, wherein each of the light output sections include a plurality of the light transmitters arranged to output signals in different directions from each other.

11. The display system according to claim 10, wherein each of the plurality of light transmitters for each of the light output sections are configured to output timing signals at a plurality of different strength levels.

12. The display system according to claim 9, wherein the display device alternately displays images to be viewed at a first viewing position and a second viewing position on a time division basis, the first viewing position being different than the second viewing position.

13. The display system of claim 12, wherein the plurality of light transmitters output timing signals in synchronization with the images displayed by the display device.

14. The display system of claim 9, wherein the image pickup element is positioned behind a plurality of pixel circuits of the display, and the image pickup element receives ambient light that is passed through free space parts of the plurality of pixel circuits.

15. A system for controlling output of at least one light transmitter, the system comprising:

an image pickup element for generating image data of at least one object positioned a distance away from the image pickup element;

a position determiner for processing the image data received by the image pickup element to determine position information of the at least one object identified in the image data; and an light output controlling section for controlling output strength level of a plurality of light transmitters configured to output timing signals based on the determined position information, wherein the position information is relative to a position of the image pickup element and includes vertical position information, horizontal position information, and distance information for each of the objects identified in the image data, and wherein for a given object, a signal strength of the timing signals directed towards said object is directly related to a determined distance of said object from the image pickup element.

16. The system according to claim 15, wherein the light transmitters are infrared light transmitters.

17. The system according to claim 15, wherein each light transmitter emits timing signals in a different direction.

* * * * *